United States Patent [19]
Fujii et al.

[11] Patent Number: 6,042,042
[45] Date of Patent: Mar. 28, 2000

[54] SEAT BELT RETRACTOR

[75] Inventors: Hiroaki Fujii; Yuichi Sawatari, both of Tokyo, Japan

[73] Assignee: Takata Corporation, Tokyo, Japan

[21] Appl. No.: 09/215,536

[22] Filed: Dec. 18, 1998

[30]     Foreign Application Priority Data

Jan. 6, 1998  [JP]  Japan .................................. 10-001002

[51] Int. Cl.[7] ................................................. B60R 22/28
[52] U.S. Cl. ......................................................... 242/379.1
[58] Field of Search ........................ 242/379.1; 280/805; 297/470, 471, 472

[56]              References Cited

U.S. PATENT DOCUMENTS

| | | | |
|---|---|---|---|
| 4,323,205 | 4/1982 | Tsuge et al. | 242/379.1 |
| 5,618,006 | 4/1997 | Sayles | 242/379.1 |
| 5,687,926 | 11/1997 | Sayles | 242/379.1 |
| 5,772,144 | 6/1998 | Tanabe et al. | 242/379.1 |
| 5,934,597 | 8/1999 | Ludwig | 242/379.1 |

FOREIGN PATENT DOCUMENTS 8-127313  5/1996  Japan .

*Primary Examiner*—John M. Jillions
*Attorney, Agent, or Firm*—Kanesaka & Takeuchi

[57]              ABSTRACT

A seat belt retractor absorbs impact by deforming a roll made of steel just like reversely rolling up. When acceleration exceeds a threshold for example in the event of vehicle collision, a lock gear is locked by a lock activating mechanism and pawls engage some of internal teeth of a lock base. A webbing is loaded with significantly large tension by the occupant being moved forward due to the acceleration so that extremely large torque is applied to the lock base from the reel through the pawls. Because of this torque, the steel roll plastically deforms just like being reversely rolled up from the inner end so that the webbing is gradually unwound, thereby softening impact acting on the occupant by the webbing.

8 Claims, 6 Drawing Sheets

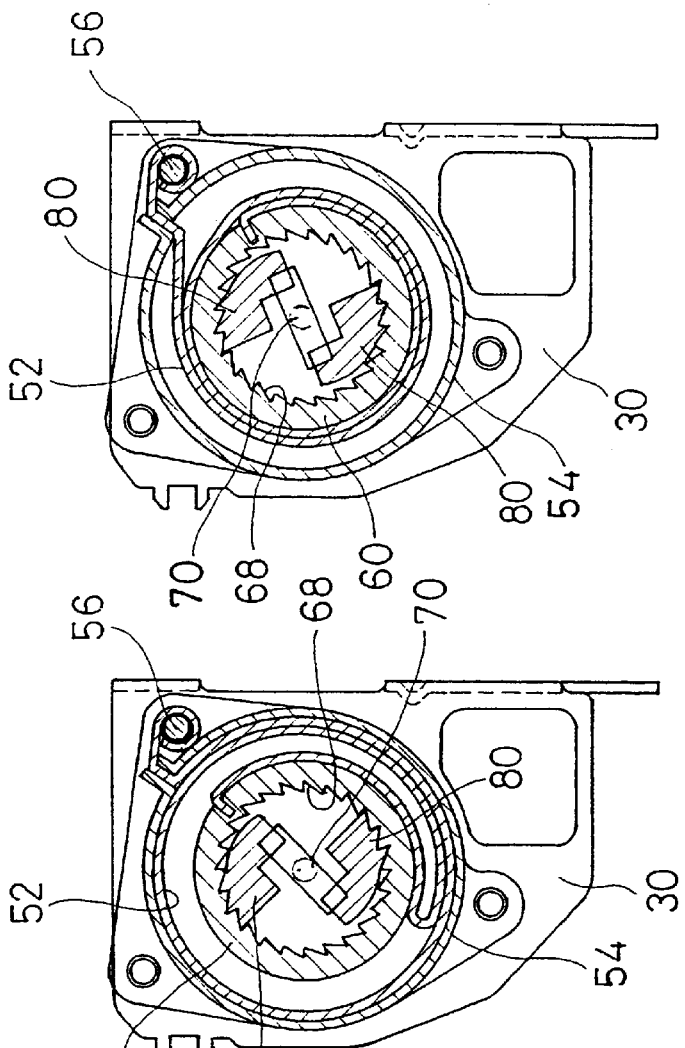
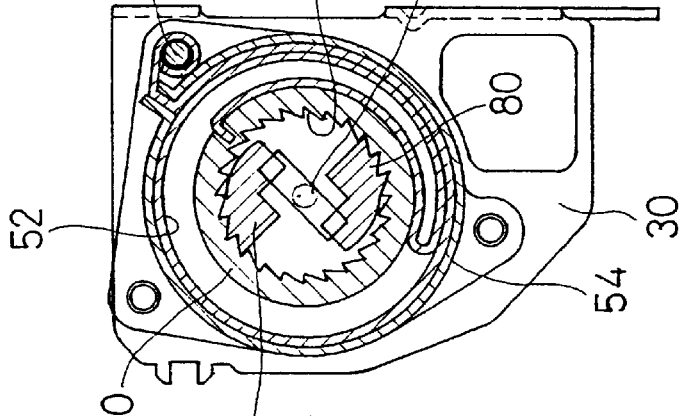
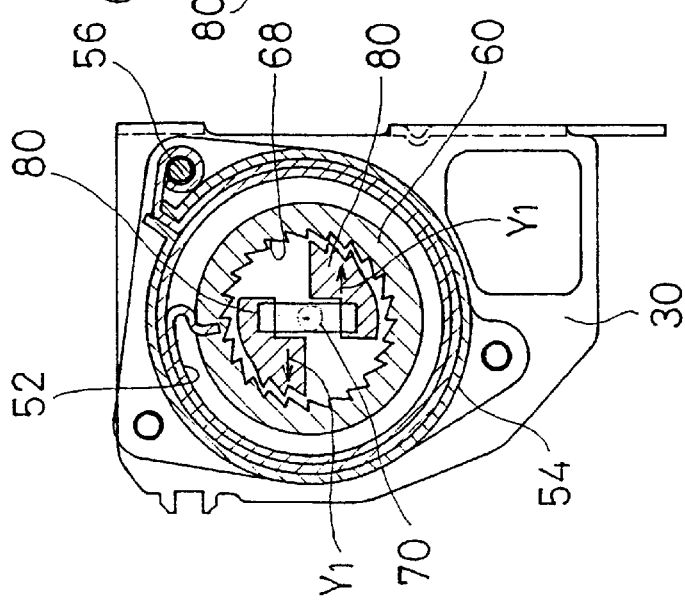

SEAT BELT RETRACTOR

FIELD OF THE INVENTION

The present invention relates to a seat belt device for restraining an occupant in a seat of a vehicle and, more particularly, to a seat belt retractor for winding a webbing. In detail, the seat belt retractor to which the present invention relates is of an EA (Energy Absorbing) type in which when the retractor performs locking operation for preventing the unwinding of the webbing, the webbing is allowed to be slightly unwound (for example, about 10–30 cm) against the tension applied to the webbing, thereby reducing the stress on the occupant by the webbing.

DESCRIPTION OF PRIOR ART

A seat belt device comprises a webbing, a retractor which winds the webbing onto a reel by spring force to retract the webbing and which stops the unwinding of the webbing from the reel only when impact is exerted, a buckle device fixed to a predetermined position of a vehicle cabin for fitting the webbing to an occupant's body, and an anchor.

In the seat belt device as mentioned above, the webbing is locked from being unwound from the retractor in the event of a collision, so the occupant's body is restrained by the locked webbing. A conventional mechanism for locking the webbing locks the reel having the webbing wound thereon so as not to rotate.

Various retractors have been already developed in order to soften the impact on the occupant's body when the occupant is rapidly restrained from moving forward by the locking of the reel as mentioned above. In such a retractor, the webbing is allowed to be unwound for a predetermined amount with keeping a predetermined tensile load on the webbing, thereby absorbing the impact energy acting on the occupant.

Disclosed in Japanese patent publication No. 8-127313A is one of EA type seat belt retractors. The seat belt retractor absorbs impact by plastic deformation of wires as shown in FIG. 6 through FIG. 8C.

The seat belt retractor comprises a frame 10 which is formed in a channel shape having side walls 10a, 10b. The side walls 10a, 10b are provided with circular openings, respectively. An internal gear 12 is disposed around the inner periphery of each circular opening. The internal gears 12, 12 are fixed not to rotate relative to the openings of the side walls 10a, 10b when torque below a predetermined value is exerted and to rotate along the inner peripheries of the openings when torque exceeding the predetermined value is applied.

The internal gears 12, 12 have grooves 16, 16 for winding wires 14, 14 formed in the outer peripheries thereof, respectively. The wires 14, 14 with high rigidity are connected to the respective internal gears 12, 12 and wound in the grooves 16, 16. The wires 14, 14 extend downward along the frame 10, pass through spaces between the rods 18, 20 fixed to the side walls 10a, 10b, and then extend forward horizontally along the side walls 10a, 10b. Each wire 14 has a stopper 22 at the end thereof. The stopper 22 is formed in a size not to pass between the rods 18, 20.

A reel 24 is inserted and disposed in the frame 10 to extend between the internal gears 12 and 12. A spring for winding up a webbing W and an emergency locking mechanism (not shown) are assembled to the reel 24. The emergency locking mechanism has pawls 26, 26 which engage some of teeth of the corresponding internal gears 12, 12.

When deceleration applied to the vehicle exceeds a predetermined value and/or when the speed of unwinding the webbing exceeds a predetermined value, the pawls 26, 26 engage some of teeth of the corresponding internal gears 12, 12 to prevent the reel 24 from rotating in a webbing unwinding direction. As mentioned above, the internal gears 12, 12 are fixed to the side walls 10a, 10b not to rotate when torque below the predetermined value is exerted. As the torque exerted on the internal gears 12, 12 from the reel exceeds the predetermined value, the fixing of the internal gears 12, 12 to the side walls 10a, 10b are released and the internal gears 12, 12 thus rotate. At this point, the wires 14, 14 are wound into the grooves 16, 16 of the internal gears 12, 12. Since the wires 14, 14 move through the space between the rods 18 and 20 with bending due to the rods 18, 20, so this plastic deformation of the wires 14, 14 absorbs the impact, which acts on the occupant by the webbing. The rotation of the reel is stopped at a time when the stopper 22 comes in contact with the rods 18, 20.

The conventional EA type seat belt retractor has a shortcoming that it is difficult to obtain a stable EA load characteristic because the EA load control is conducted depending on the frictional resistance with the frictional element.

OBJECT AND SUMMARY OF THE INVENTION

It is an object of the present invention to overcome the above shortcoming and to provide a seat belt retractor, in which structure is simple, and it is easy to obtain stable EA load.

A seat belt retractor of the present invention comprises: a reel for winding a webbing; a frame supporting the reel; a spring biasing the reel in a webbing winding direction; a locking mechanism for stopping the rotation of the reel in the webbing unwinding direction in the event of a vehicle emergency; and an impact absorbing mechanism for allowing the rotation of the reel in the webbing unwinding direction with keeping a predetermined tensile load on the webbing when tension exceeding a predetermined value is exerted on the webbing when the locking mechanism stops the rotation of the reel. An annular lock base for stopping the rotation of the reel in the event of the vehicle emergency is provided coaxially with the reel. The impact absorbing mechanism is provided with a metallic band roll wound spirally on the outer periphery of the lock base. The winding direction of the spiral roll from its outer end toward its inner end is equal to the webbing winding direction of the reel. The outer end of the spiral roll is secured to the frame and the inner end of the roll is connected to the outer periphery of the lock base. When the locking mechanism stops the rotation of the reel, the lock base and the reel are coupled to each other and the roll is reversely rolled up from its inside so as to be wound onto the lock base because of the rotation of the reel in the webbing unwinding direction, thereby absorbing the impact.

According to the present invention, the seat belt retractor may be structured that the lock base has internal teeth on its inner periphery, the reel is provided with pawls which rotate always integrally with the reel, the pawls are disposed inside the internal teeth, and the locking mechanism moves the pawls to engage the pawls with the internal teeth in the event of the vehicle emergency.

According to the seat belt retractor of the present invention, when deceleration (negative acceleration) exceeding a predetermined value is applied to the vehicle or when the webbing is withdrawn at a speed exceeding a predetermined value, the pawls engage the internal teeth of the lock base so as to lock the rotation of the reel in the webbing unwinding direction.

In this locked state, when the tension exerted on the webbing exceeds a predetermined value, force exceeding the yield strength of the roll is exerted on the roll from the lock base so that the roll plastically deforms just like being reversely rolling up from the inner end thereof, thereby absorbing the impact.

BRIEF DESCRIPTION OF THE DRAWINGS

FIGS. 5a, 5b, and 5c are views for illustrating the operation of the seat belt retractor of FIG. 1;

FIG. 7b is a sectional view taken along a line 7b—7b of FIG. 7a.

DETAILED DESCRIPTION OF PREFERRED EMBODIMENT

Figure 1:
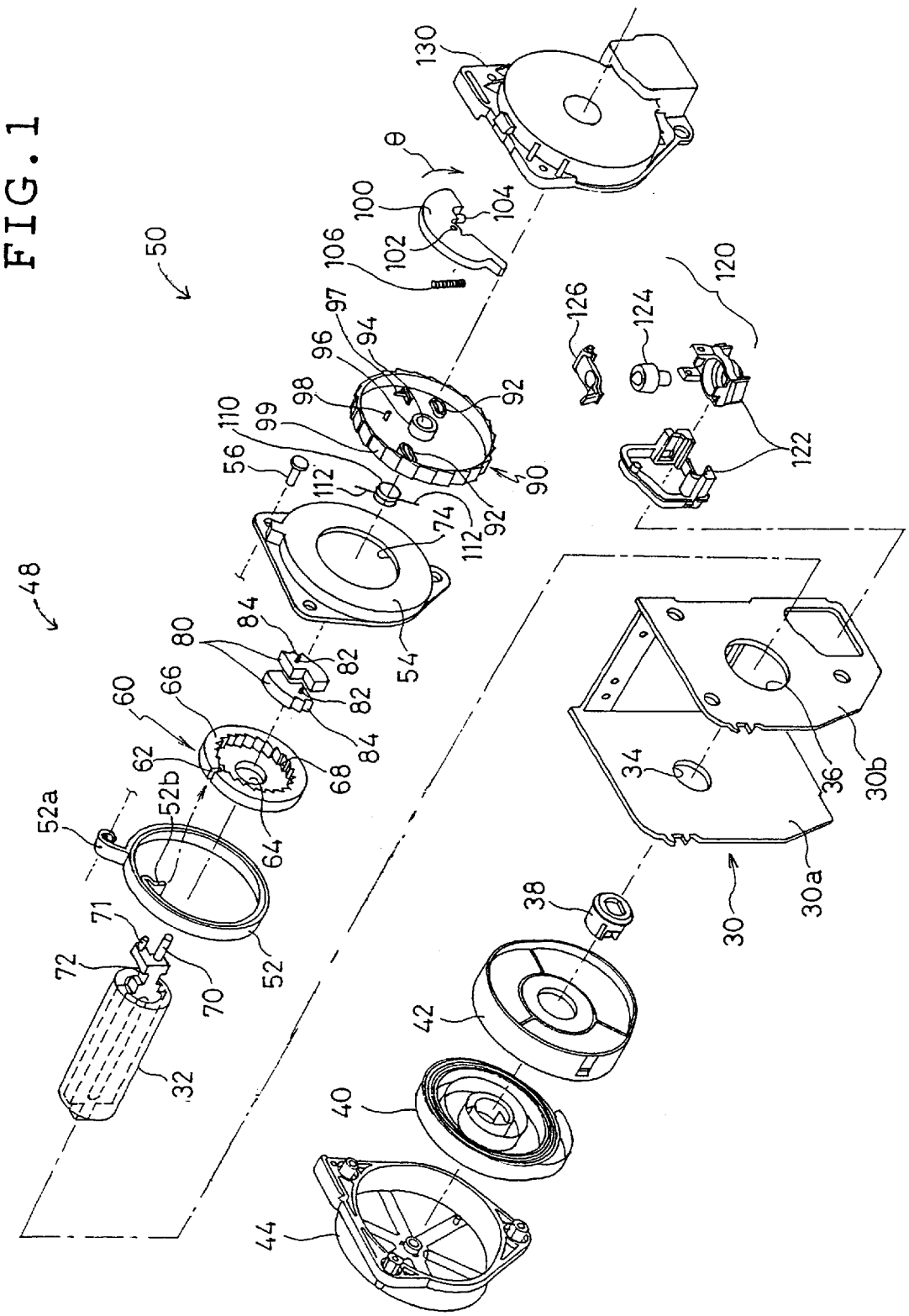
FIG. 1 is an exploded perspective view of a seat belt retractor according to an embodiment.
Figure 2:
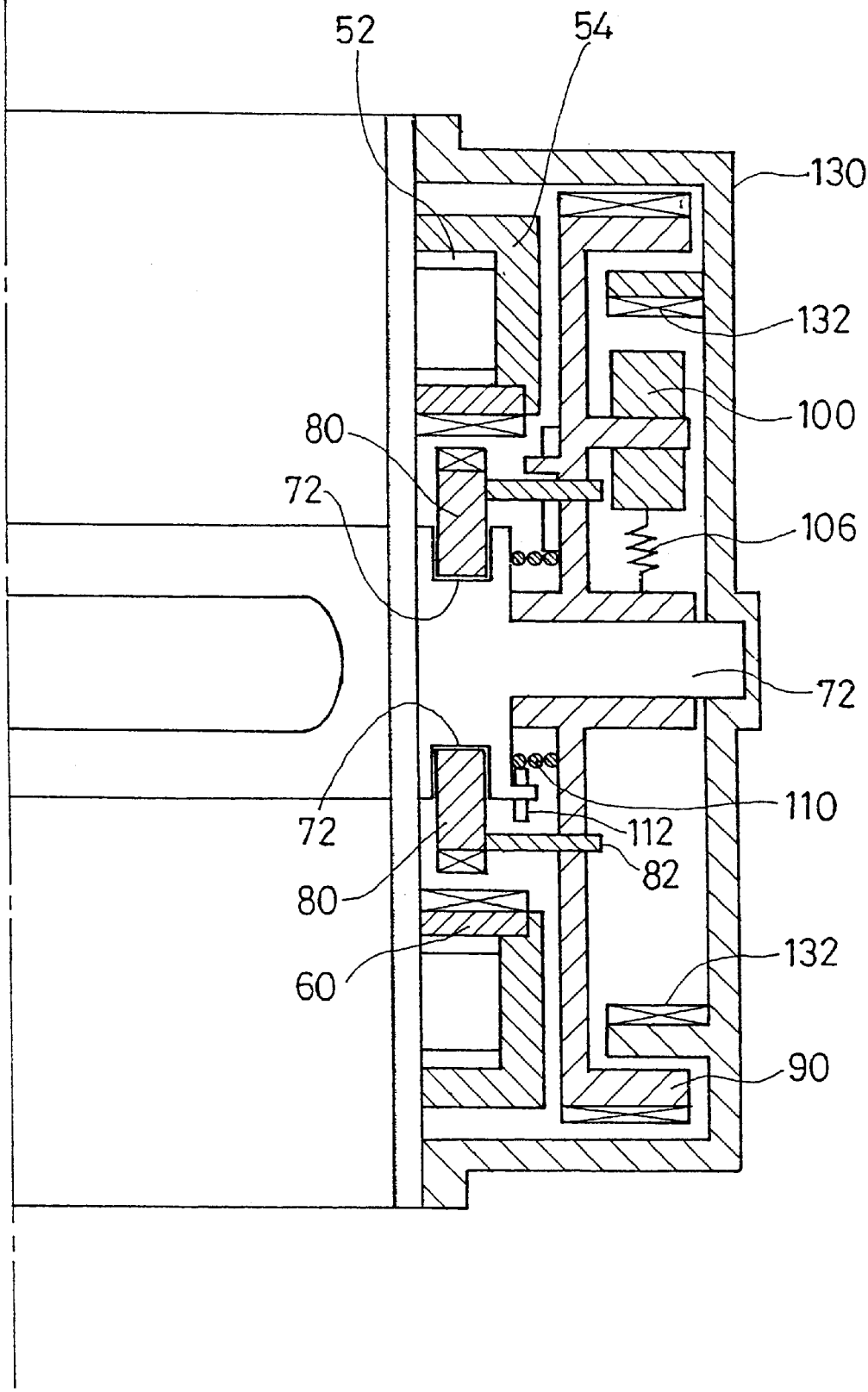
FIG. 2 is a longitudinal sectional view of main parts of the seat belt retractor shown in FIG. 1.

Hereinafter, an embodiment of the present invention will be described with reference to FIGS. 1 through 5c.

A frame 30 is formed in a channel shape having side walls 30a, 30b. The side walls 30a, 30b are provided with circular openings 34, 36 in which both ends of a reel 32 fit, respectively.

One end of the reel 32 projects outside of the side wall 30a and is connected to an inner end of a spring 40 via a bush shaft 38. The spring 40 is disposed in a box comprising a spring casing 42 and a spring cover 44. The spring casing 42 is fixed to the side wall 30a.

The other end of the reel 32 projects outside of the side wall 30b and is connected to an EA mechanism 48 and a locking mechanism 50. The other end of the reel 32 is provided with a pair of grooves 72, 72 retaining pawls 80, 80 described later, a shaft portion 70 piercing a pawl spring 110 described later, and a spring seat 71 whereby one end of the pawl spring 110 is hooked and stopped.

The EA mechanism 48 comprises a roll 52 which is a steel band and is formed spiral and accommodated in a roll casing 54. The roll casing 54 is fixed to the side wall 30b.

An outer end 52a of the roll 52 projects outside the casing 54 as shown in FIGS. 5a–5c and secured to the side wall 30b by a rivet 56. The rivet 56 also fixes the roll casing 54 to the side wall 30b.

An inner end 52b of the roll 52 is inserted into a groove 62 formed in a ring-like lock base 60 and is thus secured. The lock base 60 is prevented from rotating by the roll inner end 52b.

The shaft portion 70 of the reel 32 is inserted into a central hole 64 of the lock base 60.

The lock base 60 is provided with an annular step 66 along the periphery thereof. The annular step 66 has internal teeth 68 on the inner periphery thereof. A pair of pawls 80 is arranged inside the annular step 66. The pawls 80 engage the grooves 72 formed in the shaft portion 70 of the reel 32, respectively, in such a manner that the pawls 80 are slidable in directions of FIG. 5a. Each pawl 80 has external teeth 84 formed in the outer periphery thereof. The external teeth 84 are engageable with some of the internal teeth 68 of the lock base 60.

The roll casing 54 has a circular opening 74 through which pins 82 projecting from the pawls 80 pass to be inserted into pin guide slits 92 of the lock gear 90. The guide slits 92 extend diagonally to the radial direction of the lock gear 90.

The lock gear 90 is arranged outside of the roll casing 54 and is provided with a boss 96. The boss 96 has a central hole 94 at the center thereof, into which the shaft portion 70 of the reel 32 is inserted.

The lock gear 90 has an axial pin 98 projecting therefrom which fits in an axial hole 102 of a flywheel 100 for activating the locking action. The flywheel 100 has a projecting pin 104. A hook spring 106 consisting of a coil spring is disposed between the projecting pin 104 and a spring seat 97 of the lock gear 90. The hook spring 106 biases the flywheel 100 about the axial pin 98 in the direction of $F_1$ shown in FIG. 4. The flywheel 100 has a tooth 100a which is engageable with internal teeth 132 of a cover 130 described later. As the flywheel 100 is biased in the direction $F_1$, the tooth 100a is normally spaced apart from the internal teeth 132.

Figure 3:
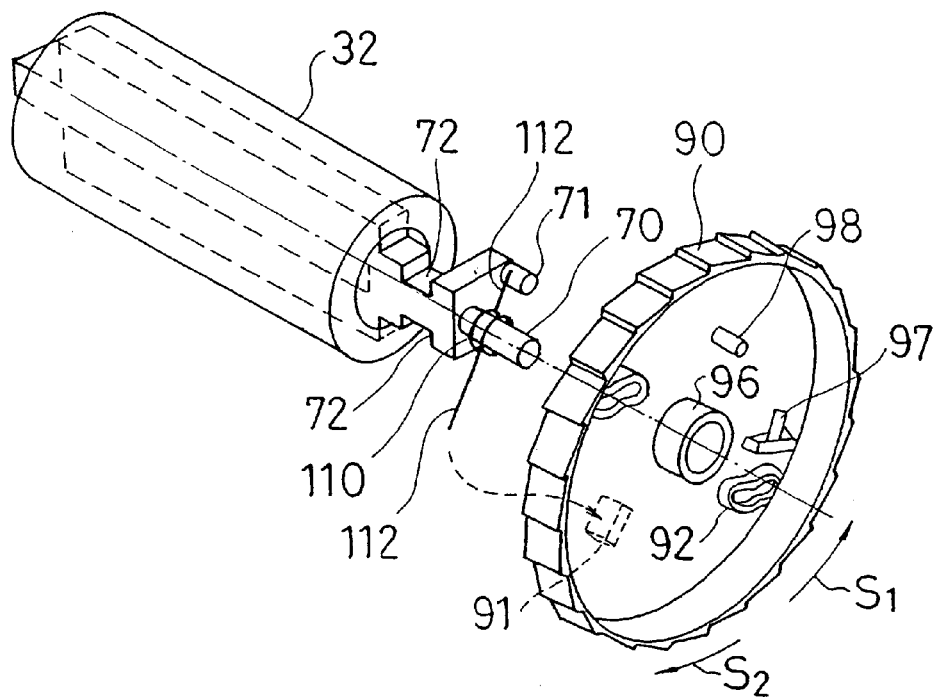
FIG. 3 is a perspective view showing the relation among a lock gear, a reel, and a pawl spring.
Figure 4:
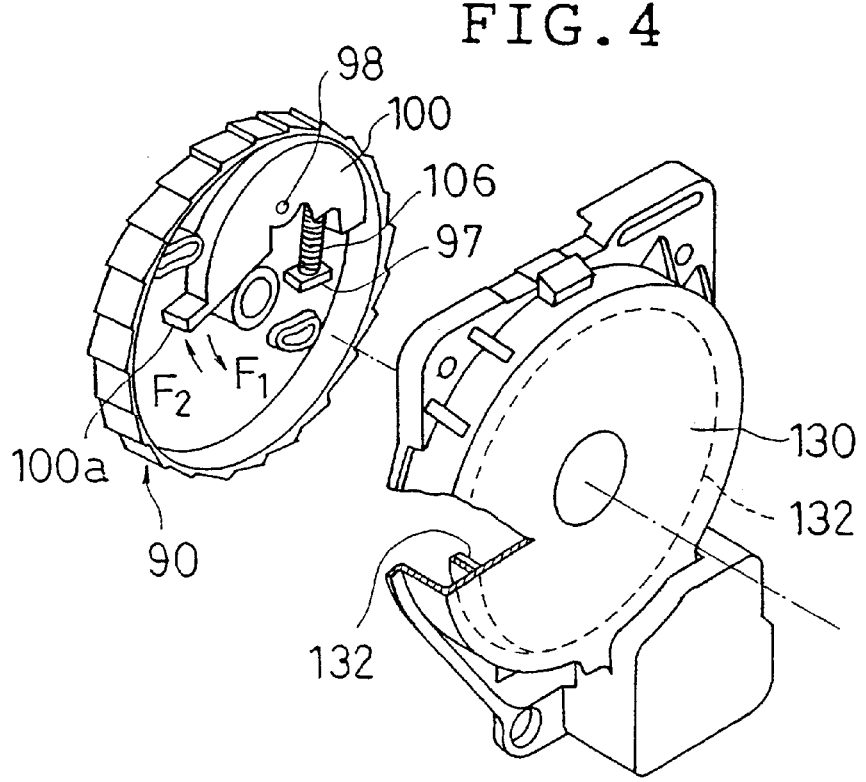
FIG. 4 is a perspective view showing the relation between the lock gear and a cover.
Figure 6:
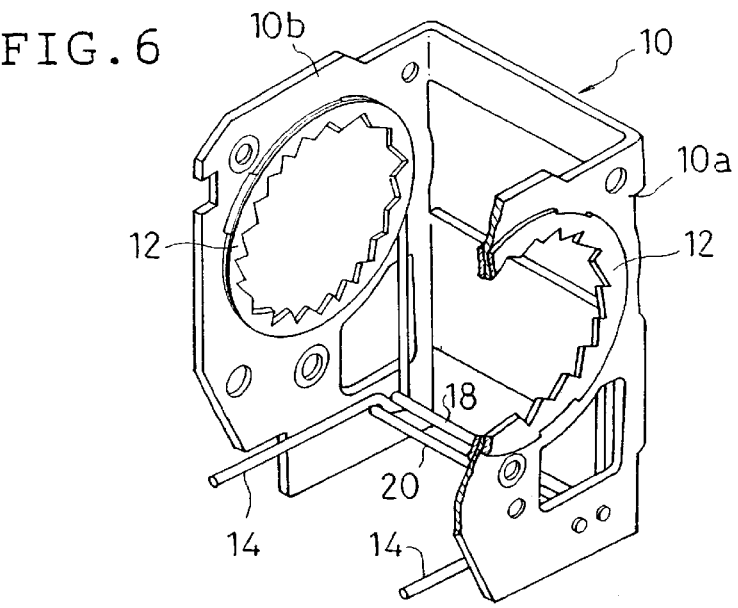
FIG. 6 is a perspective view of a frame of a seat belt retractor of a conventional example.
Figure 7A:
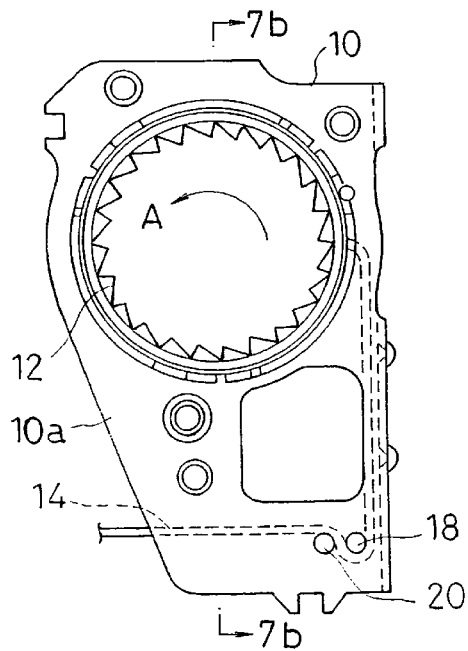
FIG. 7a is a side view of the frame shown in FIG. 6.
Figure 7B:
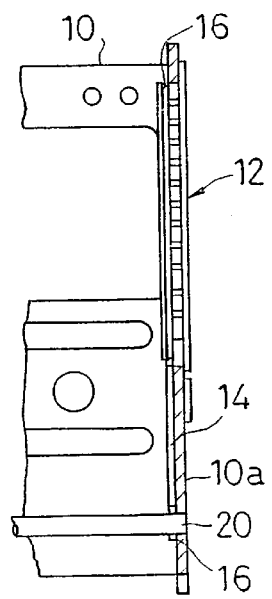
Figure 8A:
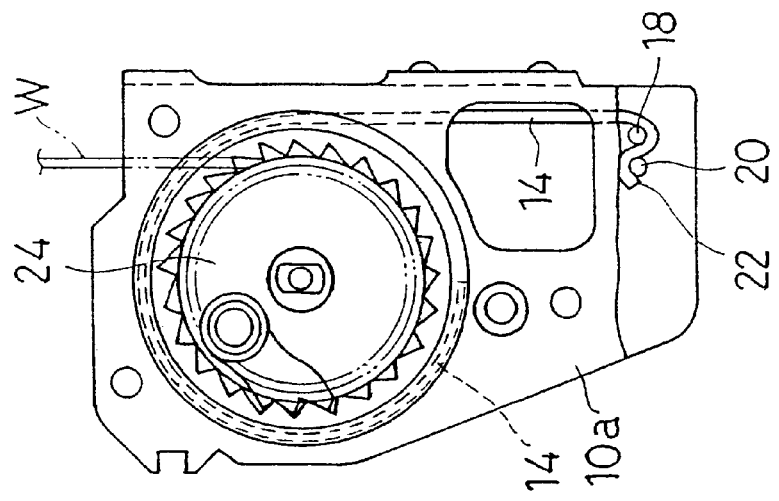
FIGS. 8a, 8b, and 8c are views for illustrating the operation of the seat belt retractor of FIG. 6.
Figure 8B:
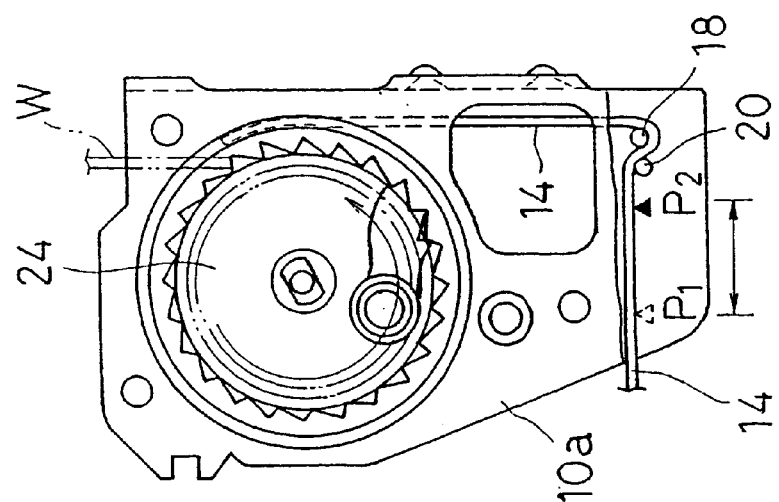
Figure 8C:
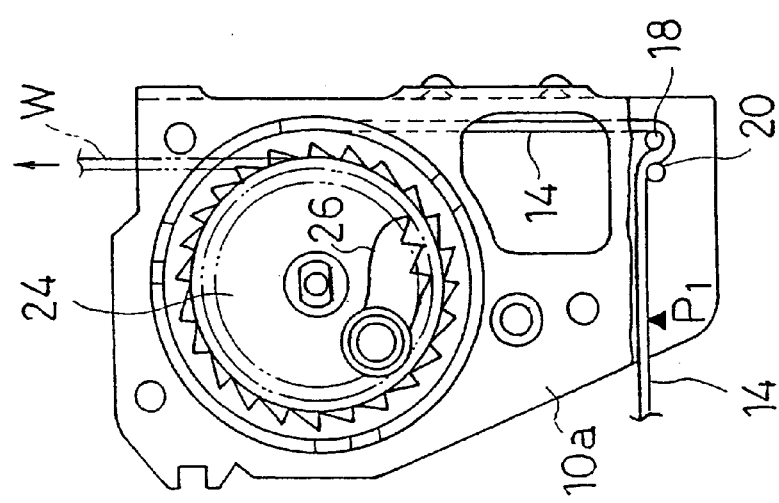

As shown in FIG. 3, the pawl spring 110 is fitted onto the shaft portion 70 of the reel 32. The spring ends 112, 112 projecting radially from the pawl spring 110 are stopped by the spring seat 71 of the reel 32 and a spring seat 91 of the lock gear 90. The pawl spring 110 biases the lock gear 90 in a direction of $S_1$ shown in FIG. 3. As the lock gear 90 is about to rotate in the direction of $S_1$ shown in FIG. 3, the pins 82 of the pawls 80 inserted in the guide slit 92 of the lock gear 90 are positioned at inside ends in the corresponding guide slits 92 i.e. the nearest position to the boss 96. In this state, the external teeth 84 of the pawls 80 are spaced apart from the internal teeth 68 of the lock base 60.

As angular acceleration exceeding a predetermined value is applied to the reel 32 in the webbing unwinding direction, the flywheel 100 rotates about the pin 98 in the direction of $F_1$ against the hook spring 106 with rotational delay relative to the reel 32. Therefore, the tooth 100a engages the internal teeth 132 so that the lock gear 90 rotates in the direction of $S_2$ of FIG. 3, the pins 82 travel within the corresponding guide slits 92 to the lock gear's outer periphery side, and the pawls 80 slide in the directions of arrows $Y_1$ of FIG. 5a so that the external teeth 84 of the pawl 80 engage some of the internal teeth 68 of the lock base 60.

A lever 126 of a lock activating mechanism 120 is engageable with one of external teeth 99 arranged on the outer periphery of the lock gear 90.

The lock activating mechanism 120 comprises a weight 124 which is held in a holder 122 in such a manner that the weight 124 can tilt, and the lever 126 is journaled to the holder 122 and is laid on the weight 124. As acceleration exceeding a predetermined value is applied to the vehicle, the weight 124 tilts and the lever 126 thus uses rises up so that the tip of the lever 126 engages one of the external teeth 99 arranged on the outer periphery of the lock gear 90, whereby the lock gear 90 is stopped from rotating. As the reel 32 further rotates from this state in the webbing unwinding direction, the pins 82 of the pawls 80 travel within the corresponding guide slits 92 to the outer periphery side of the lock gear 90, the pawls 80 slide in the directions of arrows Y₁, and the external teeth 84 engage some of the internal teeth 68 of the lock base 60.

The lock gear 90 and the lock activating mechanism 120 are covered by the cover 130. The cover 130 is fixed to the side wall 30b.

Hereinafter, the operation of the seat belt retractor will be described with reference to FIGS. 5a, 5b, and 5c. When the vehicle is in the normal state, the pawls 80 are spaced apart from the internal teeth 68 of the lock base 60 as shown in FIG. 5a. In this case, the locking mechanism 50 and the lock activating mechanism 120 are not operative so that the reel 32 is biased by the spring 40 in the webbing winding direction. When the webbing is unwound, the reel 32 rotates in the webbing unwinding direction with the spring 40 being wound. As the webbing is loosened, the webbing is wound onto the reel 32 by the spring force of the spring 40.

When acceleration (deceleration) exceeding the threshold is applied to the vehicle, the weight 124 of the lock activating mechanism 120 tilts so that the lever 126 of the lock activating mechanism 120 engages one of the external teeth 99 of the lock gear 90, thereby locking the lock gear 90. The pawls 80 slide in the directions of arrows Y₁ to engage some of the internal teeth 68 of the lock base 60, thereby preventing the reel 32 from rotating.

When the tension exerted on the webbing is smaller than a predetermined value, the aforementioned steel roll 52 does not deform so that the lock base 60 does not rotate. As the aforementioned acceleration is cancelled, the lever 126 moves apart from the external teeth 99 of the lock gear 90 to allow the lock gear 90 to rotate freely. The pawls 80 travel back in the directions opposite to the directions of arrows Y₁ to move apart from the internal teeth 68 of the lock base 60, thereby allowing the reel 32 to rotate freely. In this way, the seat belt retractor is returned to the normal state.

As angular acceleration exceeding the predetermined value is exerted on the reel by rapidly unwinding the webbing at the normal state, the flywheel 100 rotates in a direction of F₂, the lock gear 90 rotates in a direction of S₂, and pawls 80 slide in the directions of arrows Y₁ to engage some of the internal teeth 68 of the lock base 60, thereby locking the reel 32. In this case, by slightly loosening the webbing, the external teeth 84 of the pawls 80 and the internal teeth 68 of the lock base 60 are separated from each other. In this way, the seat belt retractor is returned to the normal state.

When acceleration exceeding the predetermined value is applied to the vehicle for example in the event of a vehicle collision so that the lock gear 90 is locked by the lock activating mechanism 120 and the pawls 80 engage some of internal teeth 68 of the lock base 60, the webbing is loaded with significantly large tension by the occupant being moved forward due to the acceleration so that extremely large torque is applied to the lock base 60 from the reel 32 through the pawls 80. When the torque is larger than the predetermined value, the steel roll 52 plastically deforms so as to be reversely rolled up from the inner end as shown in FIG. 5b. Because of the plastic deformation of the roll 52, the reel 32 gradually rotates so as to unwind the webbing, thereby softening impact acting on the occupant by the webbing. As the steel roll 52 is reversely rolled up completely as shown in FIG. 5c, the rotation of the reel 32 is stopped and the webbing is prevented from being further unwound.

As mentioned above, in the seat belt retractor of the present invention, the rotation of the reel is stopped by the spiral roll through the lock base in the event of vehicle emergency, and the roll plastically deforms to absorb impact on the occupant when the deceleration applied on the vehicle is extremely large. Therefore, the seat belt retractor of the present invention has advantages that the structure is simpler and more compact than the conventional retractor with EA mechanism and that it has stable load characteristic because of less friction of the EA load generating portion.

What is claimed is:

1. A seat belt retractor comprising:

a reel for winding a webbing, a frame for supporting the reel, a spring for biasing the reel in a direction for winding the webbing, a locking mechanism for stopping rotation of the reel in a direction for unwinding the webbing in an event of a vehicle emergency, and an impact absorbing mechanism for allowing the rotation of the reel in the webbing unwinding direction with keeping a predetermined tensile load on the webbing when tension exceeding a predetermined value is exerted on the webbing when the locking mechanism stops the rotation of the reel, wherein an annular lock base for stopping the rotation of said reel in the event of the vehicle emergency is provided coaxially with said reel, said impact absorbing mechanism is provided with a spiral roll formed of a spiral metallic band wound on an outer periphery of the lock base, a winding direction of said spiral roll from its outer end toward its inner end is identical with a webbing winding direction of said reel, an outer end of said spiral roll is secured to said frame and an inner end of said roll is connected to an outer periphery of said lock base, and when said locking mechanism stops the rotation of the reel, the lock base and the reel are coupled to each other and the roll is reversely rolled up from the inner end of the roll so as to be wound onto the lock base because of the rotation of the reel in the webbing unwinding direction, thereby absorbing the impact.

2. A seat belt retractor as claimed in claim 1, wherein said lock base has internal teeth on its inner periphery, said reel is provided with at least one pawl which rotates always integrally with said reel and said pawl is disposed inside the internal teeth, and said locking mechanism moves said pawl to engage said pawl with the internal teeth in the event of the vehicle emergency.

3. A seat belt retractor as claimed in claim 2, wherein said frame has first and second side walls, said reel is arranged between these side walls, said spring is disposed outside the first side wall, and said lock base and said roll are arranged outside of the second side wall.

4. A seat belt retractor as claimed in claim 3, wherein the inner end of said roll projects toward a center of said roll, said lock base has a groove formed in the outer periphery thereof, and the inner end of said roll engages said groove.

5. A seat belt retractor as claimed in claim 3, wherein provided on said reel are two pawls including said at least one pawl, which slide in radial directions of the lock base, and wherein said pawls engage with some of said internal teeth of said lock base by sliding outwardly along the radial directions.

6. A seat belt retractor as claimed in claim 5, wherein a shaft portion of said reel enters into a center of said lock base through said second side wall, and said shaft portion has a pair of grooves which said pawls engage, respectively, so that each pawl is movable along the groove in a direction coming close to the internal teeth.

7. A seat belt retractor as claimed in claim 1, wherein when an entire length of said roll is reversely rolled up on the lock base, the reel is stopped from further rotating.

8. A seat belt retractor as claimed in claim 1, wherein said locking mechanism actuates in any one of cases where acceleration exceeding a predetermined value is applied to the vehicle, where the vehicle inclines more than a predetermined angle, and where said reel rotates at an angular acceleration exceeding a predetermined value.

* * * * *